(12) United States Patent
Kimura

(10) Patent No.: US 6,221,256 B1
(45) Date of Patent: Apr. 24, 2001

(54) PORTABLE APPARATUS FOR PREVENTING DIFFUSION AND LANDING OF OUTFLOW OIL

(76) Inventor: Noboru Kimura, 7-7-10, Kotsubo, Zushi-shi, Kanagawa (JP), 249-0008

( * ) Notice: Subject to any disclaimer, the term of this patent is extended or adjusted under 35 U.S.C. 154(b) by 0 days.

(21) Appl. No.: 09/308,866
(22) PCT Filed: Mar. 9, 1998
(86) PCT No.: PCT/JP98/00951
§ 371 Date: May 26, 1999
§ 102(e) Date: May 26, 1999
(87) PCT Pub. No.: WO99/18293
PCT Pub. Date: Apr. 15, 1999

(30) Foreign Application Priority Data

Oct. 2, 1997 (JP) .................................................. 9-269766

(51) Int. Cl.[7] .................................................... E02B 15/04
(52) U.S. Cl. ........................ 210/747; 210/923; 210/242.3; 405/66
(58) Field of Search ..................................... 210/747, 923, 210/170, 242.3, 776; 405/63, 66; 114/144 A

(56) References Cited

U.S. PATENT DOCUMENTS

| | | | |
|---|---|---|---|
| 3,847,816 | * 11/1974 | DiPerna | ........................... 210/242.3 |
| 4,139,470 | * 2/1979 | Stagemeyer et al. | ................. 210/170 |
| 5,102,262 | * 4/1992 | Brown | ..................................... 405/70 |
| 5,197,821 | * 3/1993 | Cain et al. | ............................. 405/68 |
| 5,409,607 | * 4/1995 | Karlberg | ............................ 210/242.3 |
| 5,584,604 | * 12/1996 | Osterlund | ............................... 405/68 |

FOREIGN PATENT DOCUMENTS

| | | | |
|---|---|---|---|
| 2008040 | * 12/1978 | (GB) | . |
| 53-37662 | * 10/1978 | (JP) | . |
| 54-136733 | 10/1979 | (JP) | . |
| 8-13457 | 1/1996 | (JP) | . |

* cited by examiner

Primary Examiner—Duane Smith
Assistant Examiner—Frank M. Lawrence
(74) Attorney, Agent, or Firm—Dann, Dorfman, Herrell and Skillman; Henry H. Skillman

(57) ABSTRACT

A transportable apparatus for preventing the spreading and coming ashore of spilled oil that is easily transportable to a sea area where spilled oil is spread and that can perform the operation of preventing the spreading and coming ashore of spilled oil in the open area. The apparatus has an oil-fence-housing robot ship (10) and a pair of oil-fence-setting-up robot ships (20, 30) that are separably coupled together into an easily transportable block body. The apparatus encircles a sea area where spilled oil is spread with oil fences (40, 41) by remotely operating the robot ships (10, 20, 30) via radio signals.

7 Claims, 6 Drawing Sheets

PORTABLE APPARATUS FOR PREVENTING DIFFUSION AND LANDING OF OUTFLOW OIL

TECHNICAL FIELD

This invention relates to an apparatus for preventing the spreading and coming ashore of oil spilled out onto the sea from a vessel or the like.

BACKGROUND ART

When oil spills out in a harbor, the spilled oil has heretofore been prevented from spreading by the operation of encircling an oil-spilled sea surface with oil fences which is performed in the oil-spilled sea area by the crew members of an operating ship for towing and setting up the oil fences.

However, when oil accidentally spills out of a vessel in the open sea or in the ocean where tidal currents are more violent and waves are rougher than in a harbor, not only the operation performed by the operating ship is dangerous but also the operating ship itself may be capsized by accident especially in stormy weather. Under such circumstances, the operation of setting up oil fences and encircling oil spills with the oil fences is extremely difficult, and thus there exists a problem that effective measures to prevent the spreading of spilled oil cannot be taken.

DISCLOSURE OF INVENTION

Therefore, this invention has overcome the aforementioned problem by assembling an oil fence housing robot ship and a pair of oil fence setting-up robot ships having ends of housed oil fences tied thereto into an easily transportable block body in such a manner that the oil fence housing robot ship and the oil fence setting-up robot ships can be separated from one another, and by mounting rotatable steering and propelling machines onto bottoms of the oil fence housing robot ship and the oil fence setting-up robot ships, operations of the steering and propelling machines being radio-controlled independently of one another.

The block body consisting of the oil fence housing robot ship and the oil fence setting-up robot ships, which is to be mounted on a tanker, a vessel or an aircraft as a single block and which is to be transported to a sea area where spilled oil is spread as the block body, is thrown onto the sea near a sea area where spilled oil is spread while mounted on a tanker, a vessel or an aircraft, and the thus thrown pair of oil fence setting-up robot ships are separated from the oil fence housing robot ship by independent operations of their steering and propelling machines that are remotely operated by radio waves, thereby towing the ends of housed oil fences, paying off the oil fences from the oil fence housing robot ship, and encircling the sea area where spilled oil is spread in cooperation with each other to further tow the oil fences to set them up. As a result, the spreading of the spilled oil can be prevented. In addition, the encircling net set up by the oil fences is narrowed, thereby reducing the sea area where spilled oil is spread. Then, when a spilled oil recovery mother ship has arrived, a spilled oil sucking hose mounted on the oil fence housing robot ship is thrown into the spilled oil on and in the sea area encircled with the oil fences, and the crew members of the mother ship connect a recovery hose connected to the sucking hose to a recovery apparatus of the mother ship, thereby recovering the spilled oil.

Further, until the spilled oil recovery mother ship arrives, the steering and propelling machines of the oil fence housing robot ship and the pair of oil fence setting-up robot ships are radio-controlled independently of one another, so that the spilled oil is moved offshore lest the spilled oil encircled by the oil fences should wash up on the shore.

EMBODIMENT

Figure 1:
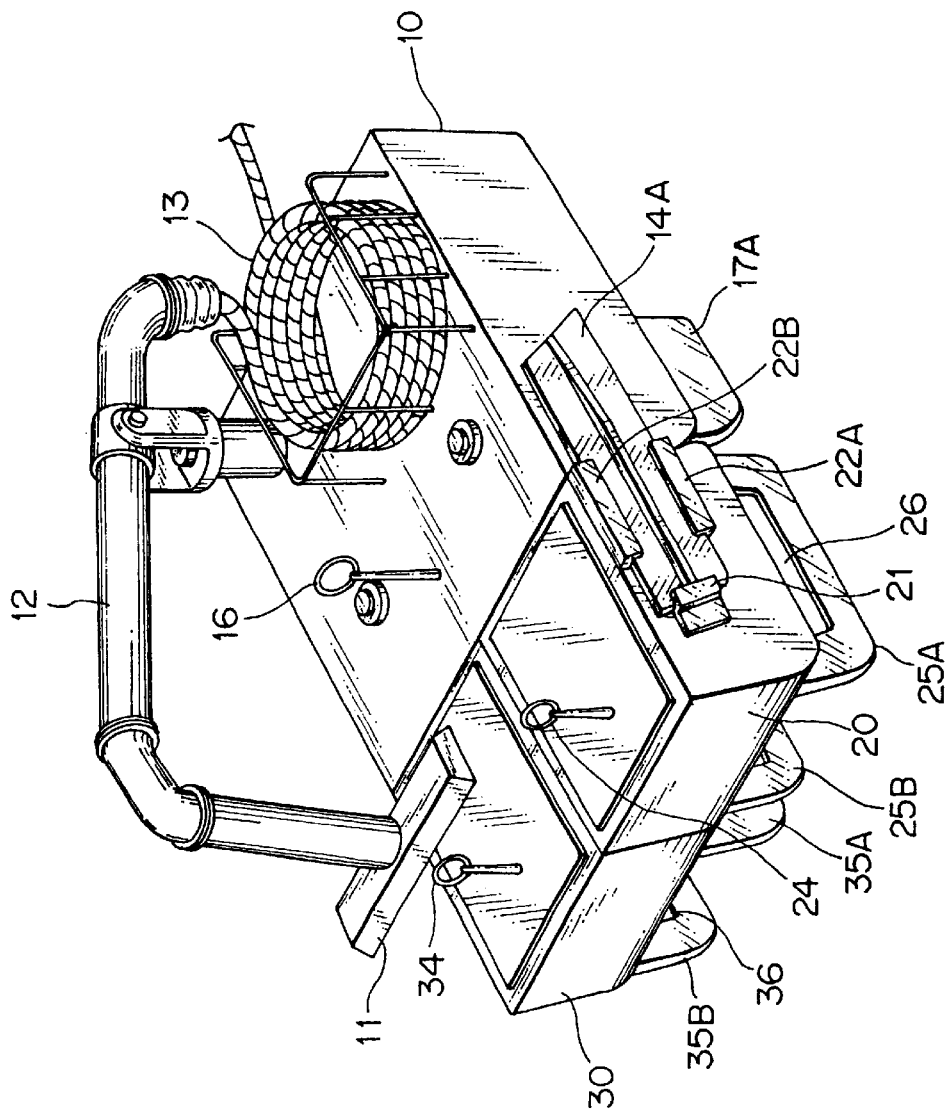
FIG. 1 is a diagram showing a block body consisting of an oil fence housing robot ship and a pair of oil fence setting-up robot ships.

FIG. 1 is a perspective view of a block body in which an oil fence housing robot ship 10 and a pair of oil fence setting-up robot ships 20 and 30 of the invention are assembled so as to be separable from one another. Inside the oil fence housing robot ship (hereinafter referred to simply as "housing ship") 10, long oil fences 40 and 41 (see FIG. 3) are housed while wound around payoff rolls.

Further, a sucking pipe 12 having a sucking nozzle 11 on its distal end is tiltably attached to the housing ship 10. The sucking pipe 12 is connected to a recovery hose 13 that is mounted on the housing ship 10, and the recovery hose 13 can be connected to a not shown recovery apparatus of an oil recovery mother ship.

Ends of the pair of oil fences 40 and 41 (see FIG. 3) housed in the housing ship 10 are tied to the pair of oil fence setting-up robot ships (hereinafter referred to simply as "setting-up ships") 20 and 30, respectively. In addition, grooved plates 21, 22A and 22B and grooved plates 31, 32A and 32B (shown in FIG. 2) are provided on outer side surfaces of the setting-up ships 20 and 30, respectively. These grooved plates serve to guide the front ends and upper and lower side ends of a pair of holding plates 14A and 14B projecting from both outer side surfaces of the housing ship 10, respectively, so that the holding plates 14A and 14B can be inserted into and released from the corresponding grooved plates. The housing ship 10 and the pair of setting-up ships 20 and 30 are assembled into a single block body by inserting the pair of holding plates 14A and 14B into the grooved plates 21, 22A, 22B, 31, 32A and 32B.

Figure 2:
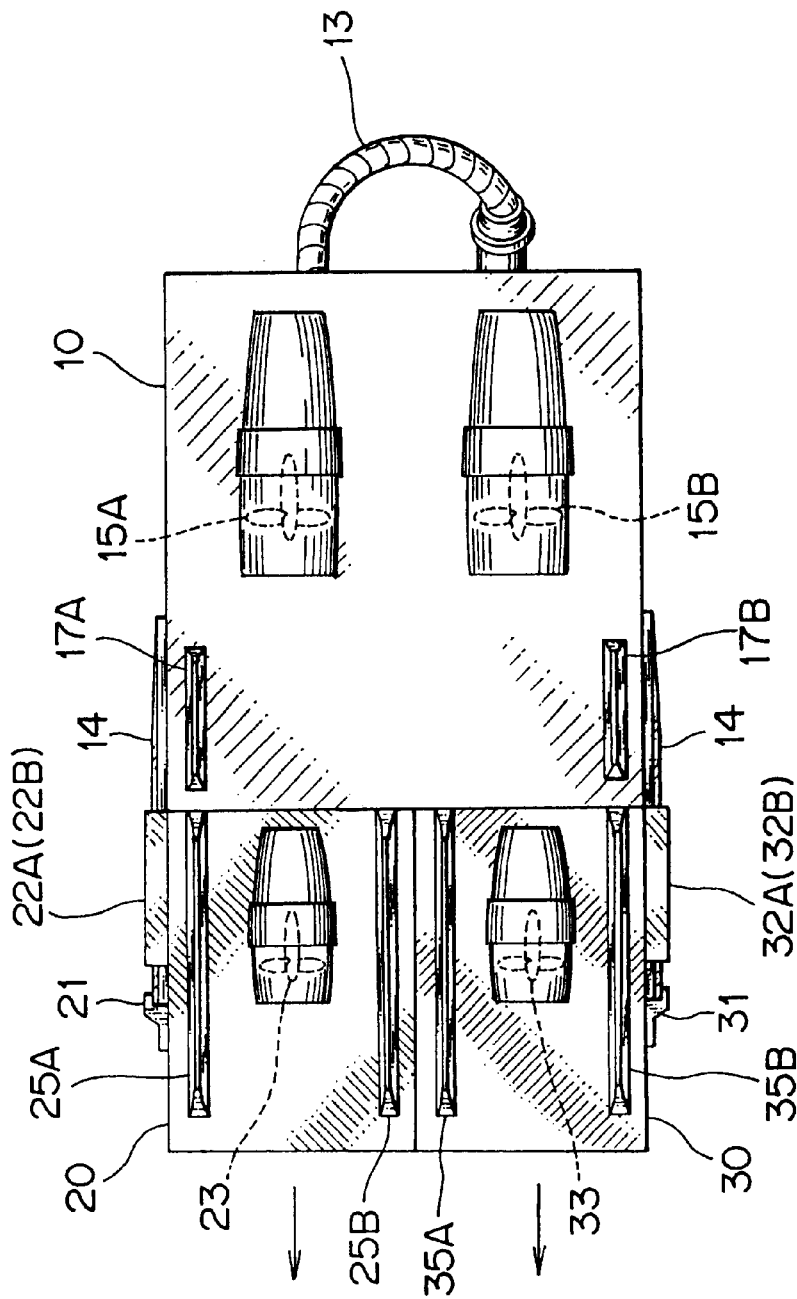
FIG. 2 is a bottom view of the block body shown in FIG. 1.

It should be noted that monolithic baglike grooved plates may replace the grooved plates 21, 22A, 22B, 31, 32A and 32B. FIG. 2 is a bottom view of FIG. 1. Screw propellers 15A, 15B, 23 and 33 that are rotatable about vertical shafts are mounted onto the bottoms of the housing ship 10 and the setting-up ships 20 and 30, respectively, as outboard motors. These screw propellers are remotely operated by radio signals received by receiving antennas 16, 24 and 34 respectively erected on the housing ship 10 and the setting-up ships 20 and 30, so that their angles of rotation are controlled as desired, and thus the housing ship 10 and the setting-up ships 20 and 30 can navigate in desired directions independently of one another.

Further, pairs of direction plates 17A, 17B, 25A, 25B, and 35A, 35B respectively projecting from the bottoms of the housing ship 10 and the setting-up ships 20 and 30 prevent the meandering of the ships. It should be noted that openings 26 and 36 are formed in the direction plates 25A, 25B, 35A and 35B of the setting-up ships 20 and 30, respectively. These openings decrease the turning radii during the navigation of the setting-up ships 20 and 30, and thus contributes to reducing a sea area where spilled oil is spread.

Figure 3:
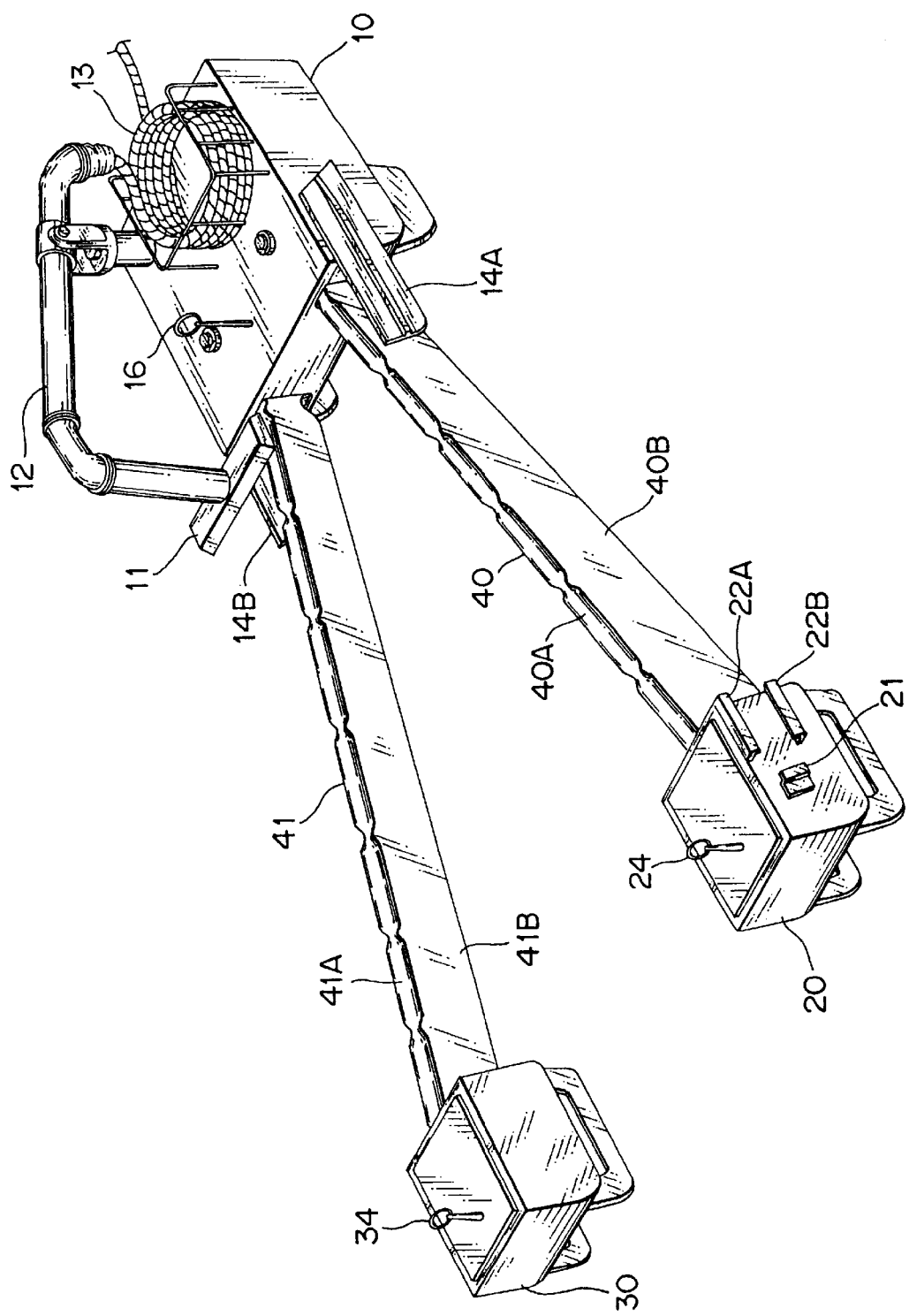
FIG. 3 is a diagram illustrating a state in which the oil fence setting-up robot ships are separated from the oil fence housing robot ship of the block body shown in FIG. 1.
Figure 4:
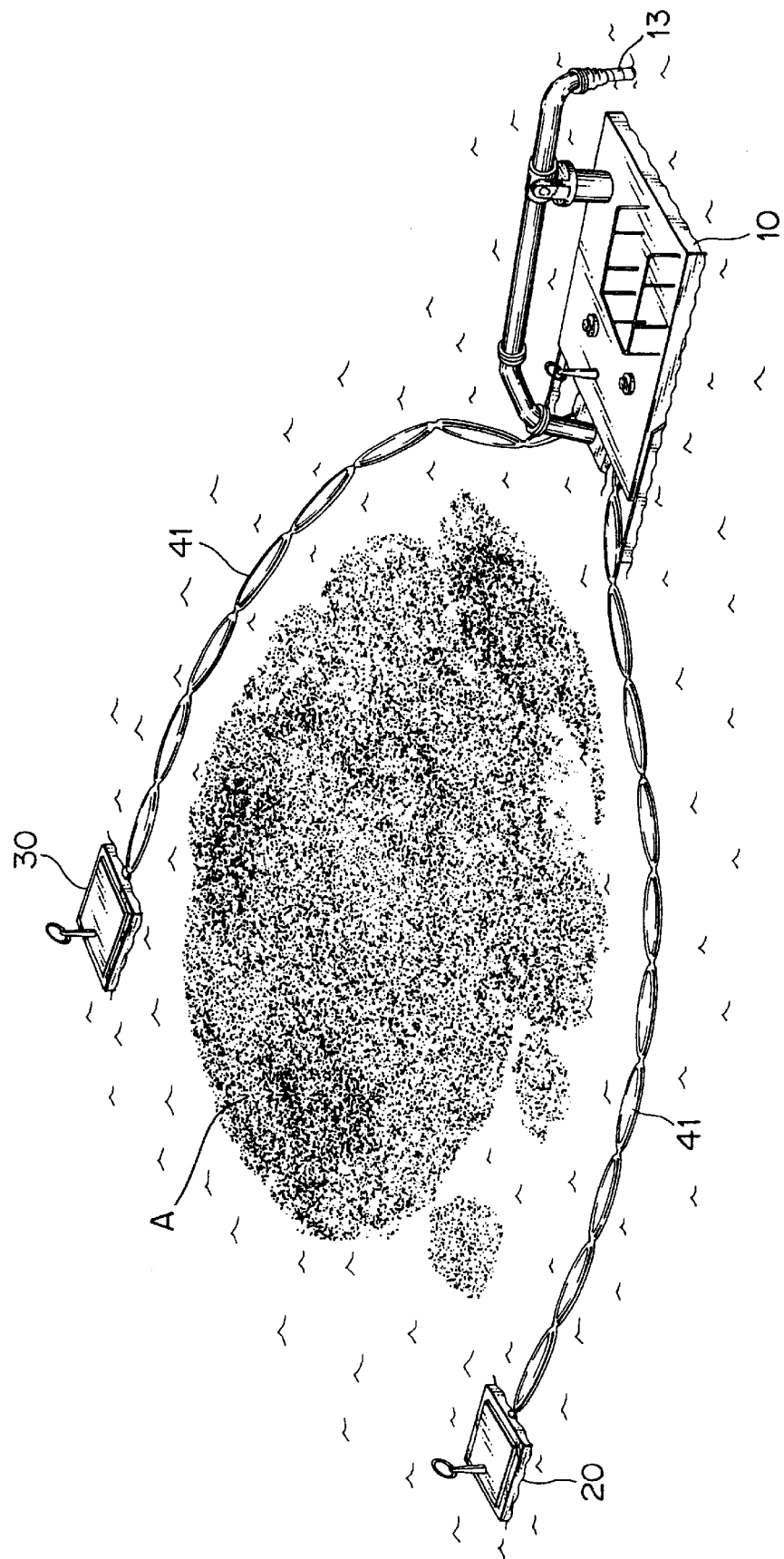
FIG. 4 is a diagram illustrating an operation of this invention.
Figure 5:
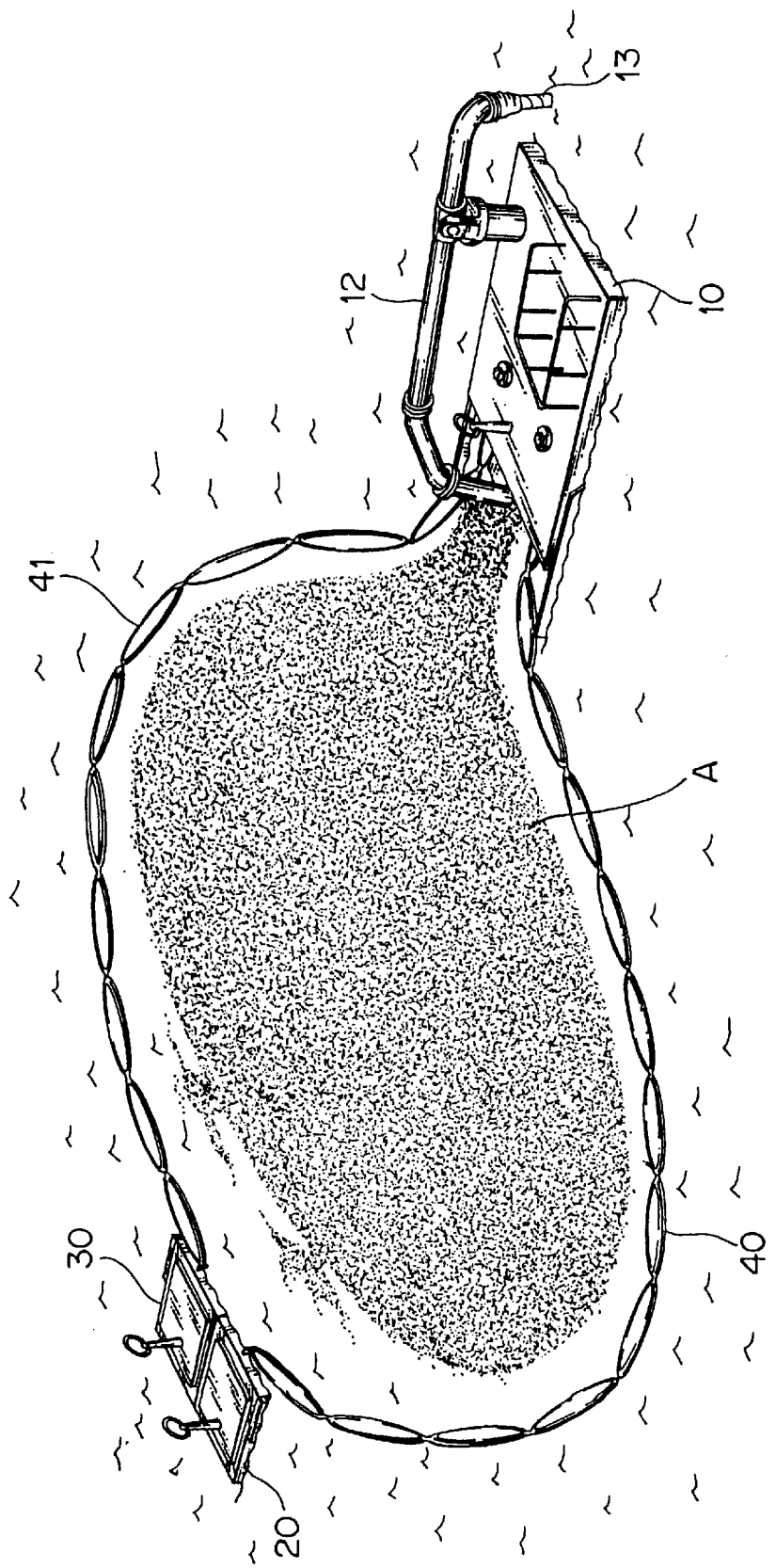
FIG. 5 is a diagram illustrating a state in which a sea area where spilled oil is spread is encircled with oil fences.

FIG. 3 is a diagram illustrating a state in which the pair of setting-up ships 20 and 30 navigate independently of each other while separating from the housing ship 10 to pay off the oil fences 40 and 41 from the housing ship 10, and are further propelled by the screw propellers 23 and 33 in the direction of encircling a sea area where spilled oil is spread. FIG. 4 is a diagram illustrating a state in which the setting-up ships 20 and 30 tow and set up the oil fences 40 and 41 in the direction of encircling a sea area A where spilled oil is spread with the oil fences 40 and 41 by wireless remote operation. FIG. 5 is a diagram illustrating a state in which after the sea area A where spilled oil is spread has been completely encircled with the oil fences 40 and 41 and after a not shown spilled oil recovery mother ship has arrived, the oil on and in the sea area A encircled with the oil fences 40 and 41 is sucked and recovered by the sucking nozzle 11 attached to the distal end of the sucking pipe 12 of the housing ship 10 when the pipe 12, which is connected to the recovery hose 13 connected to the recovery apparatus of the mother ship, tilts.

Figure 6:
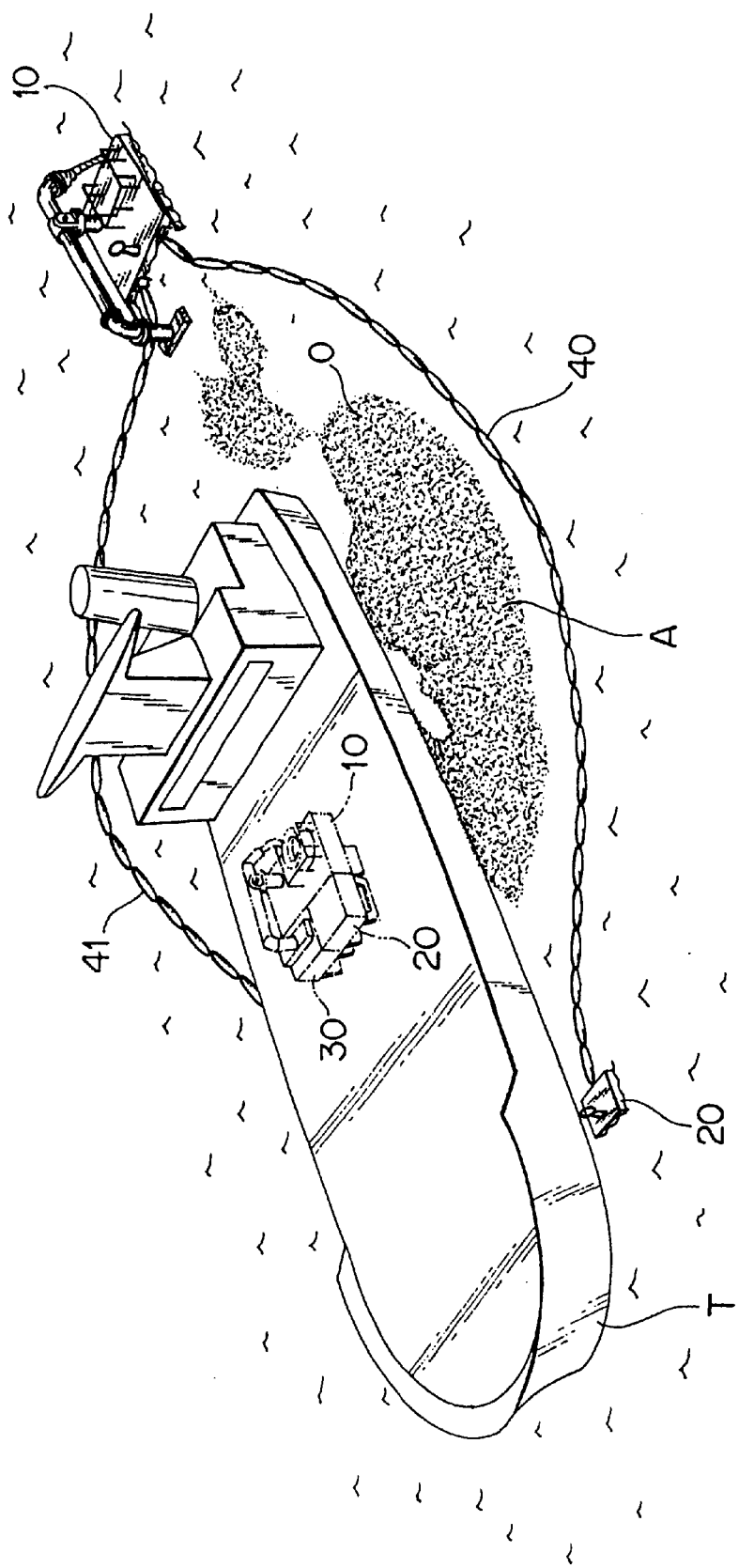
FIG. 6 is a diagram illustrating an embodiment of this invention using a tanker.

FIG. 6 is a diagram illustrating a state in which a block body (shown by a phantom line) that consists of the housing ship 10 and the pair of setting-up ships 20 and 30 and that is mounted on a tanker T is thrown into the sea area A where oil O spilled out of the tanker T is spread, and in which the pair of setting-up ships 20 and 30 separated from the housing ship 10 navigate by the wireless remote operation performed by the tanker T to encircle the sea area where spilled oil is spread with the oil fences 40 and 41.

As shown in FIG. 3, the oil fences 40 and 41 have skirts 40B and 41B that are suspended by means of plumb bobs in the sea from floating bodies 40A and 41A. The skirts 40B and 41B are high enough to prevent leakage of not only spilled oil that is drifting on the sea surface but also the spilled oil that is drifting into the sea due to its specific gravity that is different from that of seawater.

Further, if a sea area where spilled oil is spread is near the shore, the screw propellers of the housing ship 10 and the setting-up ships 20 and 30 are remotely operated to move the oil fences 40 and 41 away from the shore with the sea area A encircled with the oil fences 40 and 41 until the spilled oil recovery mother ship arrives at the spot lest tidal currents or waves should cause the spilled oil to come ashore or move shoreward.

INDUSTRIAL APPLICABILITY

This invention has the feature that a housing ship and a pair of setting-up ships are assembled into a block body that is separable and thus easy to mount and transport. Therefore, the block body can be swiftly transported to and thrown into a sea area where spilled oil is spread. Further, the housing ship and the pair of setting-up ships are robot ships having screw propellers that perform steering and propelling operations independently of one another with the screw propellers remotely operated by radio signals. Therefore, these unmanned robot ships can set up a net of oil fences to encircle a sea area where spilled oil is spread when oil spills and spreads out not only in a harbor but also in the open sea where there are strong waves and tidal currents and on the rough sea in a stormy day. Hence, the operation of preventing the spreading of the spilled oil can be performed extremely safely and reliably. Moreover, the oil fences that have encircled the sea area where spilled oil is spread can be moved by the joint operation of the housing ship and the pair of setting-up ships through remote operation. Therefore, even if oil is accidentally spilled out and spread over a sea area near the shore, the sea area where the spilled oil is spread can be moved offshore lest such sea area move shoreward. Hence, possible contamination of the seashore by the spilled oil can be prevented.

What is claimed is:

1. A method of preventing the spreading of spilled oil, characterized by comprising the steps of:

throwing a block body near a sea area where spilled oil is spread, the block body including an oil-fence-housing robot ship having a steering and propelling machine whose operation is radio-controlled attached to a bottom thereof; a pair of oil-fence-setting-up robot ships having steering and propelling machines whose operations are radio-controlled attached to bottoms thereof; and oil fences that are housed while wound in the oil-fence-housing robot ship with ends thereof tied to both the oil-fence-housing robot ship and each of the oil-fence-setting-up robot ships;

separating the pair of oil-fence-setting-up robot ships from the oil-fence-housing robot ship to unwind and extend the oil fences;

sending radio signals to said radio-controlled steering and propelling machines to navigate the oil-fence-setting-up robot ships independently of each other; and causing the extended oil fences to encircle the sea area where spilled oil is spread by navigating the pair of oil-fence-setting-up robot ships.

2. A method of preventing the spreading of spilled oil according to claim 1, wherein a sucking pipe having a sucking nozzle is attached to the oil-fence-housing robot ship;

inserting the sucking nozzle into the sea between said fences and recovering the spilled oil by the sucking nozzle after the pair of oil-fence-setting-up robot ships have encircled the sea area where spilled oil is spread.

3. A method of preventing the coming ashore of spilled oil, comprising the steps of:

throwing a block body near a sea area where spilled oil is spread, the block body including an oil-fence-housing robot ship having a steering and propelling machine whose operation is radio-controlled attached to a bottom thereof; a pair of oil-fence-setting-up robot ships having steering and propelling machines whose operations are radio-controlled attached to bottoms thereof; and oil fences that are housed while wound in the oil-fence-housing robot ship with ends thereof tied to both the oil-fence-housing robot ship and each of the oil-fence-setting-up robot ships;

separating the pair of oil-fence-setting-up robot ships from the oil-fence-housing robot ship to unwind and extend the oil fences;

sending radio signals to said radio-controlled steering and propelling machine to navigate the oil-fence-setting-up robot ships independently of each other, causing the extended oil fences to encircle the sea area where spilled oil is spread by the pair of oil-fence-setting-up robot ships; and moving the spilled oil by sending radio signals to said radio-controlled steering and propelling machines to move the oil-fence-housing robot ship, the pair of oil-fence-setting-up robot ships, the fences, and the spilled oil confined thereby.

4. A transportable apparatus for preventing the spreading and coming ashore of spilled oil comprising an easily transportable block body having an oil-fence housing robot ship and a pair of fence-setting-up robot ships, said oil-fence-housing robot ship having a steering and propelling machine whose operation is radio-controlled attached to a bottom thereof, said pair of oil-fence-setting-up robot ships having steering and propelling machines whose operations are radio-controlled attached to bottoms thereof, and a pair of oil fence sections having opposite ends, and constructed and arranged to be wound up and housed in said oil-fence-housing robot ship of said block body, one end of each section being tied to the oil-fence-housing robot ship, the opposite end of each section being tied to one of said pair of oil-fence-setting-up robot ships, said three robot ships being separably coupled together and being able to be easily transportable when coupled together, and when the oil-fence-housing robot ship and the pair of oil-fence-setting-up robot ships are separated from one another to be navigated independently of one another by said steering and propelling machines.

5. A transportable apparatus for preventing the spreading and coming ashore of spilled oil according to claim 4, including a sucking pipe having a sucking nozzle attached to the oil-fence-housing robot ship.

6. A transportable apparatus for preventing the spreading and coming ashore of spilled oil according to claim 2 wherein said oil-fence-housing robot ship has a front end, said pair of oil-fence-setting-up robot ships being coupled to said front end, said sucking nozzle being mounted for tilting to the sear surface between said oil-fence-setting-up robot ships adjacent said front end of the oil-fence-housing robot ship when said oil-fence-setting-up robot ships are uncoupled from said oil-fence-housing robot ship.

7. A transportable apparatus for preventing the spreading and coming ashore of spilled oil according to claim 6, wherein said oil-fence-housing robot ship has a pair of first latching elements at the front end, and said pair of oil fence setting-up robot ships each has a second complementary latching element adapted to cooperate with one of said first latching elements to separably couple said three robot ships together.

\* \* \* \* \*